Nov. 15, 1960
J. B. ETZENHOUSER
2,959,998
TAPE CUTTING MACHINE WITH MEANS TO
EXPOSE THE END OF THE TAPE
Filed Sept. 24, 1957
2 Sheets-Sheet 2
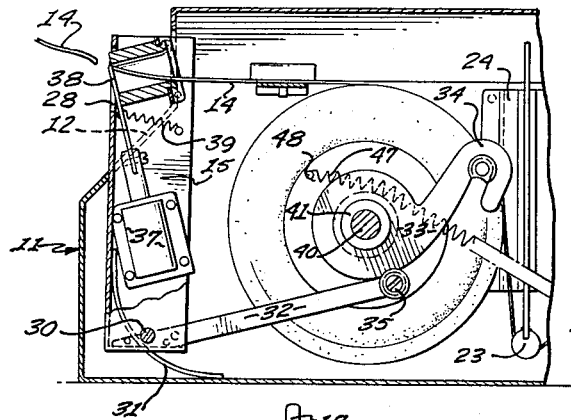
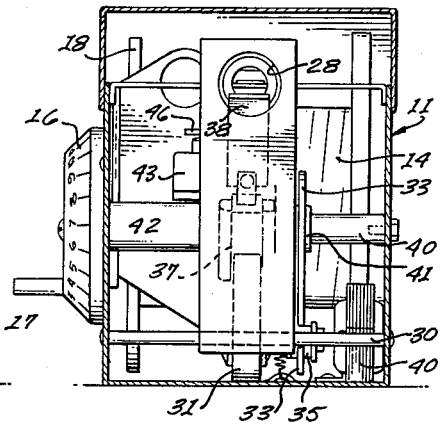
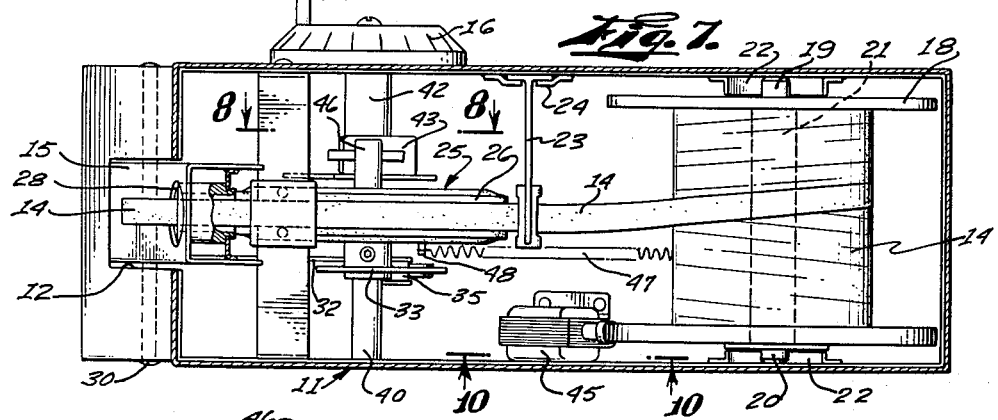
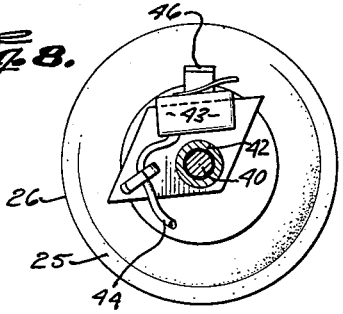
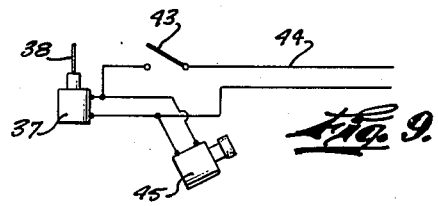
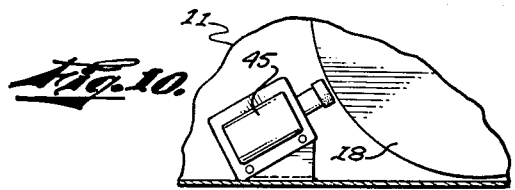
JOHN B. ETZENHOUSER,
INVENTOR.
BY
AGENT.

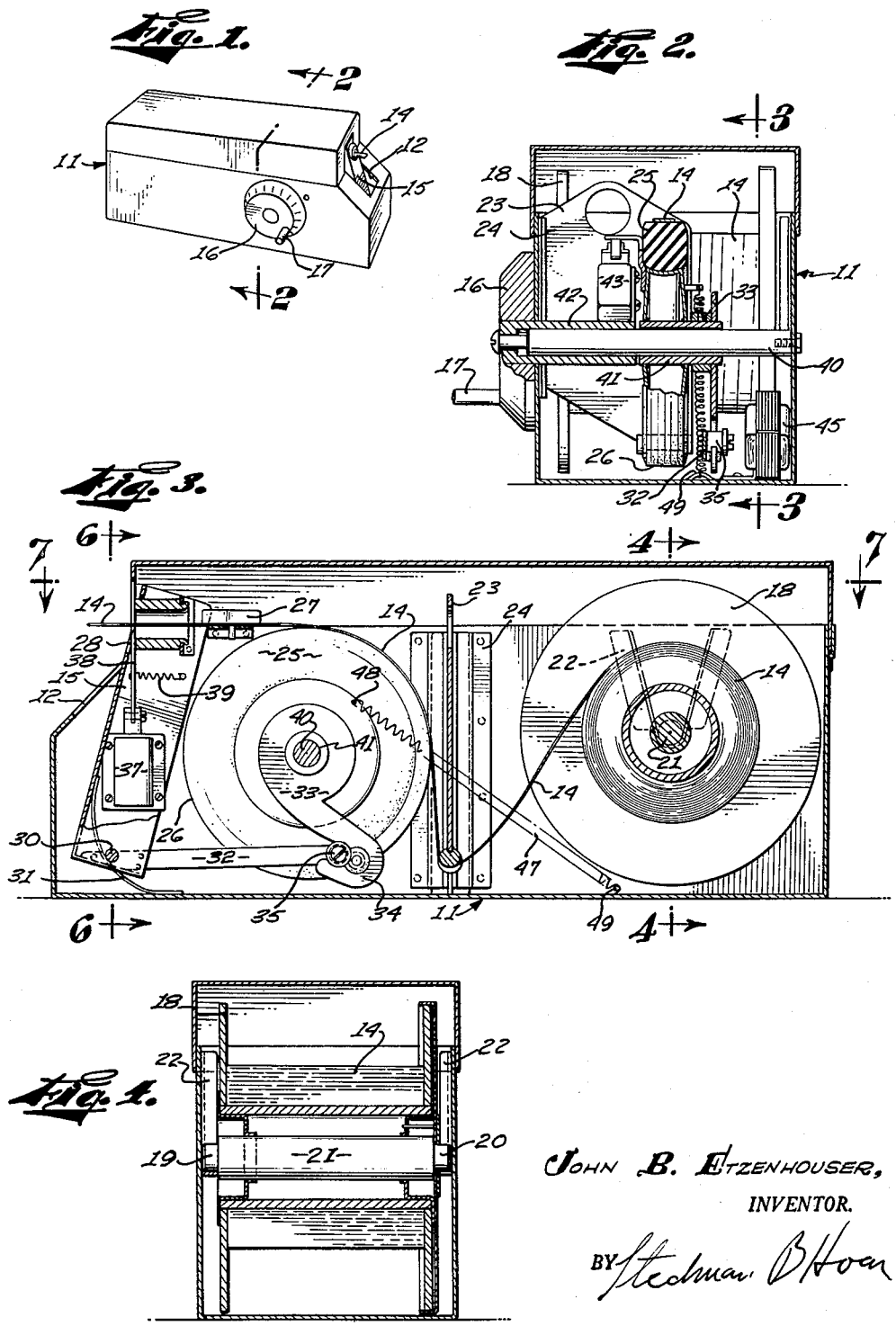

2,959,998
Patented Nov. 15, 1960

2,959,998

TAPE CUTTING MACHINE WITH MEANS TO EXPOSE THE END OF THE TAPE

John B. Etzenhouser, Santa Ana, Calif., assignor to Plas-Ties Company, Santa Ana, Calif., a partnership Filed Sept. 24, 1957, Ser. No. 685,946

4 Claims. (Cl. 83—369)

My invention relates to machinery for cutting measured lengths of tapes, ribbons, and like filamentary material. It is a principal object of my invention to provide a machine which will cut from a roll of tape a plurality of pieces of tape of precisely uniform lengths.

Another object of my invention is to provide a machine for cutting tape in which the measurements of the severed pieces can be quickly and easily altered as desired.

My invention finds particular use in cutting tape of the type used for tying cellophane bags or for tying growing plants, as such uses demand large numbers of pieces of tape of uniform lengths, but the use of my machine is by no means limited to such employment.

In terms of broad inclusion, my invention comprises a first spindle on which a roll of tape may be mounted and a second spindle on which a measuring wheel is mounted. Rotation of the measuring wheel is effected by pulling on the end of the tape, which passes through a shear. A gauge wheel, which may be adjusted as desired, arcuately adjusts a micro-switch so as to vary the position at which the switch is tripped by a finger on the side of the measuring wheel. The micro-switch actuates two solenoids, one acting on the shear to cut the tape and the other on a brake to hold the roll of tape fast during the shearing. When the tape is cut, a spring returns the measuring wheel to its original position. A cam on the measuring wheel engages a lever on the shear mounting to permit the shear mounting to move outward with the tape before the tape is cut, by spring-actuation, and then moves the shear mounting inwardly as the measuring wheel returns to its original position, so as to leave a short length of tape extending beyond the shear to afford a finger-hold for the next pulling of the tape.

In the accompanying drawings, illustrative of a presently preferred embodiment of my invention, Fig. 1 is a perspective view of my tape-cutting machine;

Fig. 2 is a vertical transverse sectional view, on an enlarged scale, on the line 2—2 of Fig. 1, with the direction of view as indicated by the arrows;

Fig. 3 is a vertical longitudinal sectional view, on the line 3—3 of Fig. 2, showing the measuring wheel in normal position and the tape protruding from the shear ready for pulling;

Fig. 4 is a vertical transverse section on the line 4—4 of Fig. 3, showing the mounting of the tape roll;

Fig. 5 is a fragmentary sectional view similar to Fig. 3 at the instant of shearing the tape;

Fig. 6 is a vertical transverse sectional view on the line 6—6 of Fig. 3;

Fig. 7 is a horizontal sectional view on the line 7—7 of Fig. 3, showing the mechanism in plan.

Fig. 8 is a fragmentary vertical longitudinal section on the line 8—8 of Fig. 7, showing the micro-switch mechanism by which the shear is actuated;

Fig. 9 is a diagrammatic view of the electric circuits of the device; and

Fig. 10 is a fragmentary sectional view on the line 10—10 of Fig. 7, showing the brake which acts upon the tape roll.

Having reference now to the details of the drawings, my improved tape-cutting machine may be enclosed in a small box 11 as shown in Fig. 1. The box 11 has a portal 12 at one end, through which the tape 14 extends and which permits the shear housing 15 to oscillate back and forth. Otherwise the mechanism may be completely enclosed except for the gauge wheel 16 mounted on the side of the box 11 and operated by a handle pin 17.

The tape 14 will be wound originally upon a roll or drum 18 which may be changed or replaced when the tape thereon has been used. The roll 18 may, for that purpose, be removably mounted on the heads 19 and 20 of a spindle 21 which is journalled in V-frames 22 mounted on the inner sides of the box 11. The head 20 is removable to permit the roll 18 to be placed upon the spindle. The tape 14 is then led under a tightening bracket 23 which may be removably mounted in a keyway 24 on the side of the box 11, and is then trained from the tightening bracket over a measuring wheel 25 having a friction surface 26, aligned with the roll 18.

The purpose of the tightening bracket 23 is to provide sufficient contact of the tape 14 upon the measuring wheel 25 to insure turning the wheel 25 when the tape is pulled by its free end. From the measuring wheel 25, the tape is led through a stationary but adjustable grip 27 which may suitably comprise one or more friction blocks adjustably spaced to grip the tape with sufficient tightness, to prevent the tape from responding to a reverse rotation of the measuring wheel 25. The tape then passes through a window 28 in the top of the shear housing 15 and out of the box 11 through the portal 12.

The shear housing 15 is arranged to pivot upon a pivot pin 30 adjacent its lower end, against the resistance of a leaf spring 31. Rigidly secured to the shear housing 15 is a lever 32 which engages a cam 33 on the measuring wheel 25, and when rotation of the measuring wheel 25 and cam 33 permit, as shown in Fig. 5, the leaf spring 31 tilts the shear housing 15 away from the measuring wheel, keeping the lever 32 in engagement with the cam 33 as a limit factor to the amount of tilt. The cam 33 has at its high end a hook 34 which engages a finger 35 on the free end of the lever 32, thus positively placing a limit on the clockwise rotation of the measuring wheel 25, as seen in Fig. 3, and also placing a limit on the amount of inward tilt, toward the measuring wheel 25, which the cam 33 can induce the shear housing 15 to make.

Mounted on the shear housing 15 is a solenoid 37 which carries a knife 38, responsive to actuation of the solenoid to move reciprocably. The knife 38 when withdrawn, rests against one edge of the window 28; when advanced, it crosses the window opening and rests on both edges of the window. To hold the knife 38 firmly against the window frame while it moves to cut a tape, a small spring 39 may be mounted between the knife and the shear housing 15.

The gauge wheel 16 and the measuring wheel 25 are both mounted, but separately, on a shaft 40 extending across the box 11. The measuring wheel 25 is mounted upon a sleeve 41 which rotates freely about the shaft 40 and carries also the cam 33. The gauge wheel 16 is secured to a sleeve 42 which also rotates about the shaft 40. Secured to the sleeve 42 so as to be co-axial with the measuring wheel 25 is a micro-switch 43 which extends parallel to the measuring wheel 25 and is connected by suitable conduits 44 to a source of power (not shown) and which actuates both the knife-actuating solenoid 37 and a brake-actuating solenoid 45 which acts on the rim of the tape roll 18. A pressure finger 46 extends from the side of the measuring wheel so that its orbit is intersected by the micro-switch 43. The micro-switch 43 may be posited at any desired radius of the shaft 40 by turning the gauge wheel 16 and sleeve 42. When thereafter, the measuring wheel 25 is rotated relatively to the shaft 40, the pressure finger will rotate with the measuring wheel until it comes in contact with the micro-switch 43, at which instant it energizes both the knife-solenoid 37 and the brake-solenoid 45. The movement of the measuring wheel 25 is also controlled by a spring 47 extending between a pin 48 on the cam side of the wheel 25 and a pin 49 on the floor of the box 11. The spring 47 urges the measuring wheel 25 in the clockwise direction as seen in Figs. 3 and 5 to bring the hook 34 on the cam 33 into its limiting position in contact with the finger 35, as illustrated in Fig. 3.

In operation, a roll of tape being on the spindle 21 and the tape being trained under the tightening bracket 23, over the measuring wheel 25, through the grip 27 and the window 28 and out of the portal 12, and the gauge wheel 16 having been set to a desired setting, the operator pulls on the end of the tape extending from the portal. Pulling on the tape causes the measuring wheel 25 to revolve. The cam 33 revolves with the measuring wheel 25, causing the hook 34 to detach from the finger 35 and permitting the lever 32 to ride inwardly on the cam 33 as urged by the leaf spring 31. The leaf spring, not being held by the lever 32, tilts the shear housing 15 toward the portal 12. The box 11, framing the portal 12, will provide a limit to the tilt of the shear housing 15, if the cam 33 does not do so. The foregoing movements are actuated by the manual pull upon the tape, assisted by release of the leaf spring 31, and resisted by the extension of the spring 47.

When revolution of the measuring wheel 25 brings the pressure finger 46 into contact with the switch 43, a sufficient length of tape will have passed beyond the knife 38, according to the setting of the gauge wheel 16. Pressure on the switch activates both the solenoids 37 and 45. The solenoid 45 holds the tape roll 18, to prevent over-feeding of the tape, and the solenoid 37 actuates the knife to cut the tape in the tilted position of the shear housing 15. As soon as the tape is cut, leaving only the cut piece in the operator's hand, all parts of the machine are free to return to their original position. The grip 27 will release the tape just enough to loosen the tape upon the measuring wheel 25 and allow the wheel to turn back as urged by the spring 47, but will hold the tape end outstanding through the window 28 while the window and shear housing swing back as urged by the cam 33 acting on the lever 32. A small end of tape is thus left outstanding through the window 28 to provide the operator with a grip for the next pull. The brake solenoid 45 is released, and the knife solenoid 37 returns to normal position as soon as contact is broken at the micro-switch 43.

The disclosed embodiment is not to be construed as a limitation upon my invention, the scope of which is deemed to include any desirable constructive modification within the spirit and breadth of the appended claims.

I claim:

1. In a machine for cutting tape or like filamentary material into predetermined lengths: a roll for carrying material to be cut, rotatably mounted; a wheel aligned with said roll, over which said material is trained from said roll, a pull on the free end of said material causing said wheel to rotate in one direction; a first spring urging said wheel to rotate in the opposite direction; a cam carried by said wheel to rotate therewith; a knife having a chisel-like end blade transverse to the path on which said material leaves said wheel, said knife being reciprocable endwise and being pivoted to swing said blade arcuately and laterally toward and away from said wheel; a second spring connected to said knife, urging said knife arcuately and laterally away from said wheel; a lever connected to said knife and urged by said second spring into engagement with said cam, rotation of said wheel and said cam in said opposite direction causing said lever to move said knife arcuately and laterally toward said wheel against the urging of said second spring; an electric switch independently rotatably mounted coaxially with said wheel; a gauge for setting the rotation of said switch at a predetermined degree relative to said wheel; a finger on said wheel for energizing said switch when said wheel has been rotated relatively to said switch by said predetermined degree; and a solenoid actuable by said switch to project the blade of said knife reciprocably across the path of said material, to sever said material and to leave said wheel free to rotate in said opposite direction.

2. In a machine for cutting tape or like material, the structure set forth in claim 1, and a window through which the free end of said material may extend, said knife when projected by said solenoid extending across said window, said window being mounted to pivot arcuately in unison with said knife so as to leave an end of said material outstanding from said window when said knife and said window are pivoted toward said wheel.

3. In a machine for cutting tape or like material, the structure set forth in claim 1, and means for gripping said material disposed between said wheel and said knife, said means being adjustable to permit said material to loosen upon said wheel sufficiently and so to allow said wheel to rotate in said opposite direction, while yet holding said material extended across said knife.

4. In a machine for cutting tape or like material, the structure set forth in claim 1, and a second solenoid energized by said switch, and a brake projected by said second solenoid against said roll at the instant said first solenoid projects said knife to sever said material.

References Cited in the file of this patent

UNITED STATES PATENTS

| | | |
|---|---|---|
| 1,772,170 | Uttz | Aug. 5, 1930 |
| 2,650,433 | Krueger | Sept. 1, 1953 |
| 2,839,137 | Hanscom | June 17, 1958 |